United States Patent [19]

Blaha

[11] Patent Number: 4,688,883
[45] Date of Patent: Aug. 25, 1987

[54] INTEGRATED OPTICS STRESS TRANSDUCER

[75] Inventor: Franz A. Blaha, Mount Royal, Canada

[73] Assignee: Canadian Marconi Company, Montreal, Canada

[21] Appl. No.: 736,112

[22] Filed: May 20, 1985

[51] Int. Cl.⁴ ............................................. G02B 6/42
[52] U.S. Cl. ................................. 350/96.15; 350/96.29
[58] Field of Search ............... 350/96.11, 96.12, 96.13, 350/96.14, 96.15, 96.16, 96.19, 96.29

[56] References Cited

U.S. PATENT DOCUMENTS

| | | | |
|---|---|---|---|
| 3,871,742 | 3/1975 | Kaminow et al. | 350/96 WG |
| 4,142,774 | 3/1979 | Wright | 350/96.12 |
| 4,294,507 | 10/1981 | Johnson | 350/96.13 |
| 4,408,829 | 10/1983 | Fitzgerald, Jr. et al. | 350/96.29 |
| 4,421,384 | 12/1983 | McMahon | 350/96.29 |
| 4,445,751 | 5/1984 | Divens et al. | 350/96.1 X |
| 4,471,474 | 9/1984 | Fields | 367/149 |
| 4,472,022 | 9/1984 | Bearcroft et al. | 350/96.29 |

OTHER PUBLICATIONS

Optical Fiber Sensor Technology, IEEE Journal of Quantum Electronics, vol. QE-18, No. 4, Apr. 1982, pp. 626 et seq., Giallorenzi et al.
Fiber-Optic Sensing of Pressure and Temperature, Applied Optics, vol. 18, No. 9, May 1, 1979, pp. 1445 et seq., Hocker.
Fiber Optics Strain Gauge, Applied Optics, vol. 17, No. 18, Sep. 15, 1978, pp. 2867 et seq., Butter et al.
End-Fire Coupling Between Optical Fibres and Stripe Waveguides, First European Conference on Integrated Optics, Sep. 1981, Andonovic et al.

Primary Examiner—Eugene R. LaRoche
Assistant Examiner—James C. Lee
Attorney, Agent, or Firm—Fishman & Dionne

[57] ABSTRACT

An integrated flexible optical transducer element includes an elongate substrate having parallel surfaces. Optical waveguides are disposed on the surfaces. The surfaces are tapered at least at one end of the substrate.

11 Claims, 6 Drawing Figures

INTEGRATED OPTICS STRESS TRANSDUCER

BACKGROUND OF THE INVENTION

1. Field of the Invention

The invention relates to an integrated flexible optical transducer element. More specifically, the invention relates to such an element having parallel integrated optical waveguide surfaces.

2. Description of Prior Art

Optical sensors are well known in the art and, traditionally, such sensors are formed of optical fibers. A summary of the state of the art having regard to such fiber optic sensors is given in Optical Fiber Sensor Technology, IEEE Journal of Quantum Electronics, Vol. QE-18, No. 4, April 1982, pps. 626 et seq., Giallorenzi et al. This paper discusses the characteristics and advantages, as well as several embodiments and uses, of such sensors. Specific fiber optic arrangements are also taught in Fiber-Optic Sensing of Pressure and Temperature, Applied Optics, Vol. 18, No. 9, May 1, 1979, pps. 1445 et seq., Hocker, and Fiber Optics Strain Gauge, Applied Optics, Vol. 17, No. 18, Sept. 15, 1978, pps. 2867 et seq., Butter et al.

Fiber optic transducers are also taught in U.S. Pat. Nos. 4,408,829, Oct. 11, 1983, Fitzgerald Jr. et al., 4,421,384, Dec. 20, 1983, McMahon, and 4,472,022, Sept. 18, 1984, Bearcroft et al.

Optical waveguide transducers are taught in U.S. Pat. Nos. 4,142,774, Mar. 6, 1979, Wright, and 4,471,474, Sept. 11, 1984, Fields. In the Wright patent, the waveguide extends internally through a flexible member which includes grooves on one surface thereof whereby to produce a periodic strain pattern in the waveguide on flexure of the member. In the Fields patent, waveguides are disposed on the facing, parallel, surfaces of two separate substrates. The substrates are disposed in a flexible housing.

U.S. Pat. Nos. 3,871,742, Mar. 18, 1975, Kaminow et al, 4,445,751, May 1, 1984, Divens et al and "End-Fire Coupling Between Optical Fibers and Stripe Waveguides", First European Conference on Integrated Optics, September 1981, Andonovic et al, teach methods of coupling optical fibers to optical waveguides.

SUMMARY OF INVENTION

It is an object of the invention to provide a flexible integrated optics transducer element.

More specifically, it is an object of the invention to provide such a transducer element which includes parallel, integrated optical waveguide surfaces.

In accordance with the invention, an integrated flexible optical transducer element includes a substrate having a first surface and a parallel second surface. The first and second surfaces are tapered at one end of the substrate. A first optical waveguide is disposed on the first surface and extends along the full length thereof, and a second optical waveguide is disposed on the second surface and extends along the full length thereof. A first single mode optical fiber is attached to both said first and second waveguides and comprises an input means, and a second single mode optical fiber is attached to both said first and second waveguides and comprises an output means. The input means and the output means are thus in optical communication with both the first and second optical waveguides.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
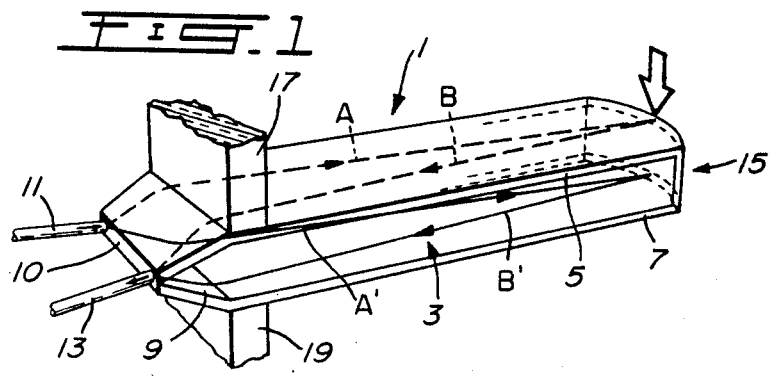
FIG. 1 is a perspective view of one embodiment of the invention.

Turning to FIG. 1, a transducer element, indicated generally at 1, comprises an elongate substrate 3 which is flexible and made of glass or other optical material with a high refractive index such as Lithium Niobate ($LiNbO_3$). The substrate has a first surface on which is disposed an optical waveguide 5 and a second, parallel, surface on which is disposed a second optical waveguide 7. Each surface of the substrate is tapered at one end 9 and, as can be seen in FIG. 2, each waveguide extends along the full length of its respective surface.

Figure 2:
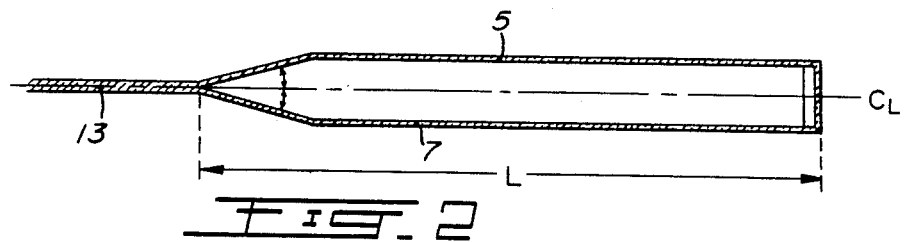
FIG. 2 is a side view of FIG. 1.

As seen in FIG. 2, the taper angle is approximated by $\alpha = \sin^{-1}(NA/N_3)$ where NA is the numerical aperture of the single mode fiber, and $N_3$ is the refractive index of the waveguides.

Prior to disposing waveguides, the top, bottom and taper surfaces are polished to be free of defects such as scratches and pits. Optical flatness of the surfaces is of secondary importance.

The tapered surfaces meet a polished edge surface 10. The edge surface 10 must be of high optical quality. A smooth transition is provided between the taper and the top and bottom surfaces by rounding off (polishing) the intersection of the surfaces and the taper. Rounding off will reduce the bending losses occurring at the transition.

The waveguides are then disposed on the top and bottom surfaces by means well known in the art.

Depending on the substrate material, a variety of well known fabrication methods, as for example indiffusion or ion exchange, can be applied to form the optical waveguides. The thickness of the waveguides is chosen to support single mode wave propagation. The waveguide thickness matches the width of the edge surface 10 such that the two waveguides from the top surface 5 and bottom surface 7 meet or slightly overlap at the edge surface.

A single mode optical fiber 11 is attached to edge surface 10 on one side of the center line of the substrate, and a second single mode optical fiber 13 is attached to the edge surface 10 on the other side of the center line. Preferably, the fibers are attached at approximately equal distance from the center line.

The optical fiber 11 comprises an input means to the transducer, and the free end of the optical fiber is attached to a coherent light source, such as a laser, as is well known in the art. The fiber 13 comprises the output means and is attached to a detector as is also well known in the art.

Figure 3:
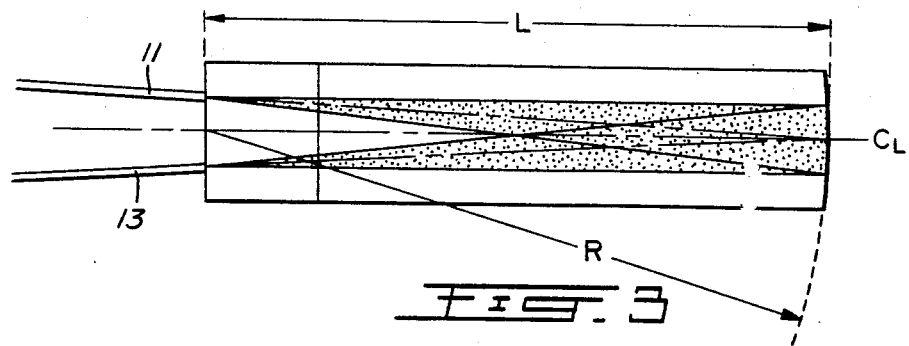
FIG. 3 is a top view of FIG. 1.

The opposite end 15 of the substrate 3 comprises a mirrored surface. Preferably, the opposite end comprises a cylindrical mirror, that is, the surface 15 is cylindrical in shape having a radius R equal to the center length L of the waveguide channel as shown in FIG. 3.

In order to ensure optimum optical communication between the optical fibers and the optical waveguides, the polished edge surface 10 must be of high optical quality. Preferably, the width of the edge surface 10 corresponds to the core diameters of the single mode fibers 11 and 13 as shown in FIG. 2.

Since the light travels within several microns of the top and bottom surfaces (the thickness of the optical waveguides) the mirror edges formed adjacent the top and bottom surfaces must be of the highest quality.

FIG. 2 shows how the optical fibers are coupled to the thin film waveguides by, for example, employing the known end-fire technique as described in the Andonovic et al reference above referred to. The fibers are prepared to have high quality cleaved ends and are manipulated to butt couple them at close and symmetrical locations onto the edge surface 10. They are butt coupled as to provide equal illumination to both the waveguides and maximum light throughput. The fibers are attached with ultraviolet curing cement and firmly bonded with a slow curing epoxy resin of low refractive index. A cast may be employed to obtain a flat shape of the epoxied element. The completed sensor has thus two pigtailed fibers securely attached at one end and leaving the other end free to flex under stress.

Referring to FIG. 3, the fibers are shown bonded to the element at equal distances from the center line $C_L$ and at an angle to illuminate the mirror symmetrically around the center thereof. In practice, this is hardly feasible. Instead, the fibers are attached with an angular tolerance ranging from parallel with the center line to inclining to the center of the mirror. However, it is important that the input fiber illuminates both guides equally and that once the input fiber is attached, the location of the output fiber is selected to correspond with the focal point of the reflected beam. This location of the output fiber corresponds to maximum light intensity output.

The sensor is dimensioned according to sensitivity and dynamic range requirements, and the cylindrical mirror is formed using optical grinding and polishing techniques. The curvature of the cylindrical mirror is symmetrical with respect to the main axis of the substrate, and the mirror may be formed by a metallic coating applied to the cylindrical surface. The coating metal, such as aluminum, gold, etc., is selected for high reflectivity at the operating wavelength.

The element is rigidly held close to the tapered end by supports 17 and 19.

In operation, light from the input fiber is split into rays A and A' along the waveguides 5 and 7 respectively. These rays are reflected by the mirror and returned as rays B and B' along the waveguides 5 and 7 respectively. The rays then exit through the output fiber 13 to a detection system.

When the free end 15 of the element is flexed by, for example, sensing pressure, the length of one waveguide will be increased while the length of the other one will be decreased. For example, if the pressure is downward as illustrated in FIG. 1, then the top surface will become convexed and the bottom surface will become concave. Accordingly, the length of waveguide 5 will be increased and the length of waveguide 7 will be decreased.

Because of the differences in the optical length of the waveguides, the phase relationships of the signal at the junction point of the output optical fiber will be varied. Both physical length and refractive index changes dominantly influence the phase variations. In measuring the variation, the extent of flexure, and therefore the strength of the pressure, can be determined. Methods for such determination are well known in the art and require no further description at this time.

Figure 3A:
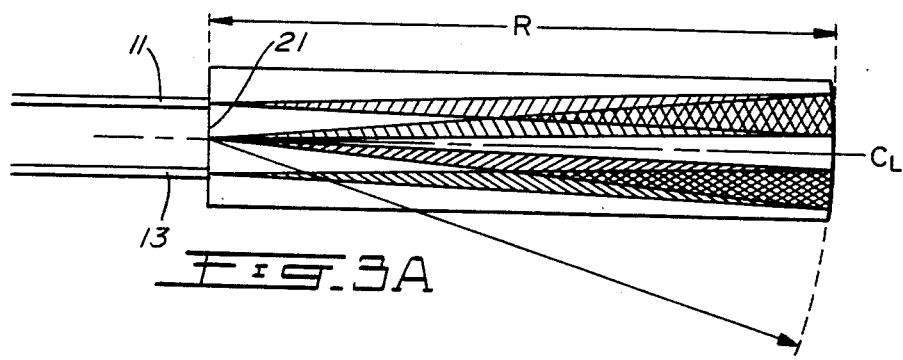
FIG. 3A illustrates a modification to the FIG. 1 embodiment.

A modification is indicated in FIG. 3A which shows the first end of the substrate also being mirrored at 21, the center area of the edge surface 10. The input fiber 11 is attached such that the beam returns to the edge surface 10 at the center line. The mirrored surface 21 reflects the beam for a second two way traverse of the slab waveguides before ending up at the output fiber 13. With this arrangement, there exists a multipath situation.

Figure 4:
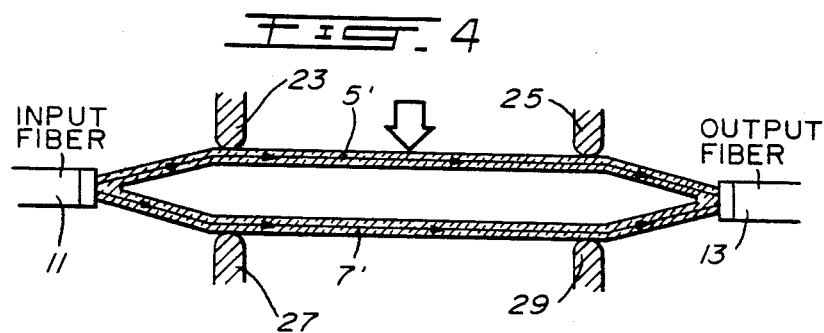
FIG. 4 is a side view of a second embodiment of the invention.

A further embodiment is illustrated in FIG. 4. As seen in FIG. 4, the top and bottom surfaces of substrate 3 are tapered at both ends. In this embodiment, the input fiber 11 is disposed at one end of the substrate and an output fiber 13 is disposed at the other end thereof. Supports 23, 25, 27 and 29 hold the substrates at both ends thereof, and pressure is applied centrally of the substrate. Once again, when pressure is applied, the lengths of the top and bottom waveguides will be increased or decreased respectively.

Figure 5:
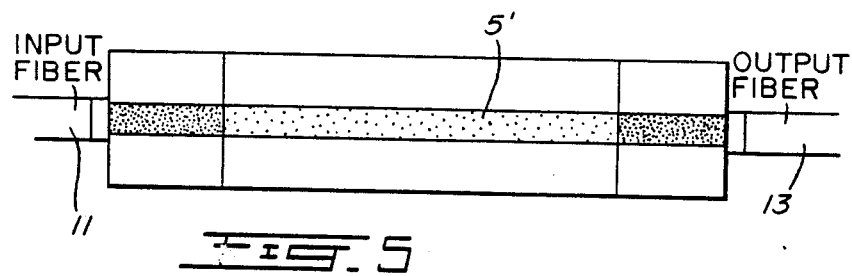
FIG. 5 is a top view of FIG. 4.

As seen in FIG. 5, it is contemplated that the waveguide can be a stripe 5' as compared to a slab illustrated in the FIG. 1 embodiment. A slab waveguide which is of lower complexity than a stripe waveguide is preferable in the FIG. 1 embodiment. However, the FIG. 4 embodiment, can only tolerate a confined ray travelling from one end of the waveguide to the other. Accordingly, a stripe waveguide is employed in the FIG. 4 embodiment requiring no focusing element.

Once again, the input fiber will be in optical communication with both the top and bottom waveguides, and the output fiber will be similarly in optical communication with both the top and bottom waveguides. The angle of the taper is designed applying the same criterion as for the FIG. 1 embodiment. Preferably, the stripe extends centrally over the top and bottom surfaces.

Although specific embodiments have been described, this was for the purpose of illustrating, but not limiting, the invention. Various modifications, which will come readily to the mind of one skilled in the art, are within the scope of the invention as defined in the appended claims.

I claim:

1. An integrated flexible optical transducer element, comprising:
    an elongate substrate having a center line extending longitudinally thereof, and having a first surface and a parallel second surface;
    said first and second surfaces being tapered at one end of said substrate;
    a first optical waveguide disposed on said first surface and extending along the full length thereof;
    a second optical waveguide disposed on said second surface and extending along the full length thereof;
    a first single mode optical fiber attached to both said first and second waveguides and comprising an input means;

whereby an identical signal is fed to both said first optical waveguide and said second optical waveguide;

a second single mode optical fiber attached to both said first and second waveguides and comprising an output means;

whereby, said input means and said output means are in optical communication with both said first and second optical waveguides;

wherein, when the elongate substrate is flexed by the application of pressure thereto, the length of one optical waveguide will be increased and the length of the other optical waveguide will be decreased relative to the lengths of the optical waveguides in their unflexed condition, whereby the phase relations of the signals from the optical waveguides at the second single mode optical fiber will be varied, to thereby indicate the degree of flexure of said elongate substrate and thus the magnitude of the pressure applied.

2. A transducer element as defined in claim 1 wherein said input means and said output means are attached at said one end of said substrate on opposite sides of the center line thereof.

3. A transducer element as defined in claim 2 wherein said second end of said substrate comprises a cylindrical mirror with a radius equal to the center length of the top waveguide.

4. A transducer element as defined in claim 1 wherein said substrate is made of glass or a material of higher reflective index such as Lithium Niobate.

5. A transducer element as defined in claim 1 and further comprising a mirrored surface at the first end of said substrate whereby said arrangement is a multipath arrangement.

6. A transducer element as defined in claim 1 wherein the first and second surfaces of said second end are tapered, said input means being attached at one end of said substrate, and said output means being attached at the other end of said substrate.

7. A transducer element as defined in claim 1 wherein said first and second surfaces taper at an approximate angle $\alpha$ which angle $\alpha = \sin^{-1}(NA/N_3)$ where $NA$ = the numerical aperture of the single mode fiber, and $N_3$ = the refractive index of the waveguides.

8. A transducer element as defined in claim 1 wherein said waveguides comprise slab waveguides.

9. A transducer element as defined in claim 1 wherein said waveguides comprise stripe waveguides extending over the first and second surfaces of said substrate.

10. A transducer element as defined in claim 6 wherein said first and second surfaces taper at an approximate angle $\alpha$ which angle $\alpha = \sin^{-1}(NA/N_3)$ where $NA$ = the numerical aperture of the single mode fiber, and $N_3$ = the refractive index of the waveguides.

11. A transducer element as defined in claim 6 wherein said waveguides comprise stripe waveguides extending centrally of the first and second surfaces of said substrate.

* * * * *